US007613595B2

(12) United States Patent
MacLay

(10) Patent No.: US 7,613,595 B2
(45) Date of Patent: Nov. 3, 2009

(54) EXECUTION AND REAL-TIME IMPLEMENTATION OF A TEMPORARY OVERRUN SCHEDULER

(75) Inventor: David MacLay, Cottenham (GB)

(73) Assignee: The Math Works, Inc., Natick, MA (US)

( * ) Notice: Subject to any disclaimer, the term of this patent is extended or adjusted under 35 U.S.C. 154(b) by 579 days.

(21) Appl. No.: 11/070,326

(22) Filed: Mar. 1, 2005

(65) Prior Publication Data

US 2006/0200795 A1 Sep. 7, 2006

(51) Int. Cl.
*G06F 17/10* (2006.01)
(52) U.S. Cl. .......................................................... 703/2
(58) Field of Classification Search ...................... 703/2
See application file for complete search history.

(56) References Cited

U.S. PATENT DOCUMENTS 4,796,179 A * 1/1989 Lehman et al. ............... 700/86
2002/0138542 A1 9/2002 Bollella et al.

OTHER PUBLICATIONS

Anonymous, "Real-Time Workshop User's Guide", Version 3, 1999, The MathWorks, Inc.*
Marco Caccamo et al.; "Handling Execution Overruns in Hard Real-Time Control Systems", Jul. 2002, IEEE Transaction on Computers, vol. 51, Issue 7, pp. 835-849.*
Anonymous; "Simulink", 2002, The MathWorks Inc., pp. 6-1 thru 6-19.*
G. Quaranta et al.; "Using Matlab-Simulink RTW to build real time control applications in user space with RTAI-LXRT", 2001, Real Time Linux Workshop Milano 2001, retrieved from http//citeseer.ist.psu.edu, six unnumbered pages.*
Dan Henriksson et al.; "TrueTime: Simulation of Control Loops Under Shared Computer Resources", Jul. 2002, 15th IFAC World Congress on Automatic Control, seven unnumbered pages.*
Anonymous, "Dealing with Task Overruns", 2004, The MathWorks Inc, 8 pages.*
Dan Henriksson et al.; "TrueTime 1.1—Reference Manual", Mar. 2003.*
Anonymous, Real Time Workshop For Use With Simulink, version 4, 2001, by The MathWorks, Inc.*
J. Liu et al., "Timed Multitasking for Real-Time Embedded Software", Feb. 2003, IEEE Control Systems Magazine, vol. 23, issue 1, pp. 65-75.*
Tobias Amnell et al., "TIMES—Tool for Modelling and Implementation of Embedded Systems", 2002, Tools and Algorithms for the Construction and Analysis of Systems, Springer, five unnumbered pages.*

(Continued)

*Primary Examiner*—Paul L Rodriguez
*Assistant Examiner*—Russ Guill
(74) *Attorney, Agent, or Firm*—Lahive & Cockfield, LLP; Kevin J. Canning; John S. Curran

(57) ABSTRACT

The automatic generation of a real-time scheduler for scheduling the execution of tasks on a real-time system is disclosed. The scheduler may allow task overruns in the execution of the tasks on the real-time system. The task overruns may occur when the execution of a task for a current sample hit is not completed before a next sample hit. When the task overruns occur, the scheduler may delay the execution of the task for the next sample hit until the execution of the task for the current sample hit is completed. The execution of the task for the next sample hit is performed after the execution of the task for the current sample hit is completed. The present invention may enable users to input information relating to the behavior in real-time execution of the graphical programs or models. The present invention may simulate the graphical programs or models using the information on the behavior of the graphical programs or models executed in the real-time execution.

32 Claims, 12 Drawing Sheets

OTHER PUBLICATIONS

Lovic Gauthier et al., "Automatic Generation and Targeting of Application-Specific Operating Systems and Embedded Systems Software", Nov. 2001, IEEE Transactions on Computer-Aided Design of Integrated Circuits and Systems, vol. 20, No. 11, pp. 1293-1301.*

Jordi Cortadella et al., "Task Generation and Compile-Time Scheduling for Mixed Data-Control Embedded Software", 2000, Proceedings of Design Automation Conference 2000, pp. 489-494.*

Adelberg, B. et al, "Emulating Soft Real-Time Scheduling Using Traditional Operating System Schedulers," Real-Time Systems Symposium, 1994, Proceedings, pp. 292-298 (1994).

Andersson, Martin et al, "TrueTime 1.3—Reference Manual," Retrieved from the internet: http://www.control.1th.se/document/2005/and+05tt.pdf, pp. 1-88 (2005).

Kao, Ben et al, "Deadline Assignment in a Distributed Soft Real-Time System," IEEE Transactions on Parallel and Distributed Systems, IEEE Service Center, pp. 428-437 (1993).

The MathWorks, "Embedded Target for Infineon C166® Microcontrollers, For Use with Real-Time Workshop® (Version 1)," Retrieved from the internet, http://mathworks.com/access/helpdesk/help/pdf_doc/c166-ug.pdf (2005).

International Search Report for Application No. PCT/US2006/007245, dated Sep. 1, 2006.

Caspi, Paul et al, "From Simulink to SCADE/Lustre to TTA: a Layered Approach for Distributed Embedded Applications," *Proceedings of the 2003 ACM Sigplan Conference on Language, Compiler, and Tool for Embedded Systems*, pp. 153-162 (2003).

Liu, Jie et al, "Timed Multitasking for Real-Time Embedded Software," *IEEE Control Systems Magazine*, vol. 23(1):65-75 (2003).

Stewart, David B. et al, "Mechanisms for Detecting and Handling Timing Errors," *Communications of the ACM*, vol. 40(1):87-93 (1997).

Invitation to Pay Additional Fees for Application No. PCT/US2006/007245, dated Jun. 14, 2006.

Erkkinen, T. "High-Integrity Production Code Generation" *AIAA GN&C*, 2002.

Janka, R.S., "Specification and Design Methodology for Real-Time Embedded Systems" *Springer*, 2002, ISBN: 0-7923-7626-9.

Balarin, F.; Lavagno, L.; Murthy, P.; Sangiovanni-Vincentelli, A.; Systems, C.D., Sanglovannie-,A. "Scheduling for Embedded Real-time Systems," *IEEE Design & Test of Computers*, vol. 15, (No. 1) *IEEE*, Jan. Mar. 1998 p. 71-82.

Sha, L; Rajkumar, R.; Sathaye, S.S. Generalized Rate-monotonic Scheduling Theory: a Framework for Developing Real-time Systems,: *Proceedings of the IEEE*, vol. 82, (No. 1), Jan. 1994. p. 68-82.

Liu, C.L.; Layland, J.W. Scheduling Algorithms for Multiprogramming in a Hard Real-time Environment,: *Journal of the Association for Computing Machinery*, vol. 20, (No. 1), Jan. 1973. pp. 46-61.

* cited by examiner

EXECUTION AND REAL-TIME IMPLEMENTATION OF A TEMPORARY OVERRUN SCHEDULER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to graphical programming or modeling environments, in particular to methods, systems and mediums for the execution and real-time implementation of a temporary overrun scheduler in the graphical programming or modeling environments.

BACKGROUND OF THE INVENTION

In practice, except for the most basic systems, mathematical models for dynamic systems involve a complex set of mathematical transformations applied in some prescribed manner with the outputs of some transformations forming the inputs of others. Each elemental transformation may be viewed in isolation as a simple dynamic system. Therefore, a complex dynamic system may be modeled as an interconnection of various simple dynamic systems. A schematic representation of such an interconnection that has evolved over the years is the block diagram. Such block diagram models have now become a standard means in textbooks, design papers, journal articles, and specifications to communicate the details of a dynamic system's behavior.

A block diagram model of a dynamic system is represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant. The source block of a signal writes to the signal at a given time instant when its system equations are solved. The destination blocks of this signal read from the signal when their system equations are being solved. The block diagram includes a plurality of blocks, lines and ports that are interconnected. Those skilled in the art will recognize that the term "blocks" does not refer exclusively to elemental dynamic systems but may also include other modeling elements that aid in readability and modularity of block diagrams.

Block diagram models are time-based relationships between signals and state variables representative of a dynamic system. The solution (computation of system response) of the model is obtained by evaluating these relationships over time, where time starts at a user-specified "start time" and either ends at a user-specified "stop time" or based on evaluating a criterion that may involved model quantities. At each time step these relationships are evaluated. Signals represent quantities that change over time, and these quantities are defined for all points in time between the block diagram's start and stop time. The relationships between signals and state variables are defined by sets of equations represented by blocks. These equations define a relationship between the input signals, output signals, state, and time.

The block diagrams are not exclusively used for representing time-based dynamic systems but also for other models of computation. For instance, flow-charts are block diagrams used to capture process flow and are not generally suitable for describing dynamic system behavior. Data flow block diagrams are block diagrams that describe a graphical programming paradigm where the availability of data (often thought of as tokens) is used to initiate the execution of blocks, where a block represents an operation and a line represents execution dependency describing the direction of data flowing between blocks.

Inherent in the various classes of dynamic systems is the notion of system sample time. The sample-time is the time interval at which the inputs, state, or outputs (collectively referred to as the results) of the systems are traced as time progresses. If a system has only one sample time, it is said to be single-rate. If a system has multiple sample times, it is said to be multi-rate. Multi-rate systems can be evaluated (executed) using either a single-tasking form of execution or a multi-tasking form of execution.

FIG. 1A shows an exemplary task execution profile of the single-rate execution scheme. In the single-rate execution scheme, a block diagram has a single sample time 1000 and runs at every sample hit (triangle) 1010. The execution of the block diagram at each sample hit is depicted as a bar 1020. As long as all the elements of the block diagram can be executed before the next sample hit, no scheduling problem occurs. When a block diagram has multiple rates, different portions of the block diagram must be run at different sample times. The simplest approach for executing a multi-rate block diagram is to use a single-tasking scheduler.

FIG. 1B shows an exemplary task execution profile of the multi-rate, single-tasking execution scheme. In this example, the block diagram has two separate sample rates. The portions of the block diagram that are associated with a base rate are executed at every sample hit. However, the portions of the block diagram that are associated with a sub-rate execute at every fourth sample hit 1030. That is, the task execution that begins at every fourth sample hit 1030 executes the portions of the block diagram that are associated with both sample rates. In this situation, the multi-rate single-tasking scheduler executes the block diagram in the manner illustrated in FIG. 1A, but enables the execution of the block diagram at multi-rates by selecting the executions, as shown below in the following pseudo code example.

```
main_task( ) {
    execute fastest blocks
    if (time == slow rate sample hit)
    {
        execute slower blocks
    }
}
```

FIG. 1C shows an exemplary task execution profile of a priority-based multi-rate, multi-tasking execution scheme. A priority-based multi-tasking scheduler is the most efficient method for executing a multi-rate system. The multi-tasking scheduler may be based on a real-time operating system (RTOS) or implemented directly as a timer interrupt service routine for the target hardware. For optimal execution, the separate tasks may be prioritized in a rate-monotonic order, from the fastest task to the slowest task. A multi-tasking scheduler allows a lower priority (longer sample time) task to be pre-empted by a higher priority (shorter sample time) task. The areas 1040-1043 in FIG. 1C correspond to task preemption, meaning that task execution is suspended by the interrupt request of a higher priority task. This process may occur on multiple levels. FIG. 1C shows an instance in which the lowest priority task (Sub-Rate 2) 1050 waits on the mid-priority task (Sub-Rate 1) 1060, which in turn is waiting on the highest priority task (Base-Rate) 1070.

The scheduling schemes described above with reference to FIGS. 1A-1C may be applied to applications where the algorithm has been specified using a block diagram modeling environment and the real-time implementation of this algorithm has been created using automatic code generation. In such cases it is possible to simulate the behavior of the algorithm using the block diagram modeling environment. In particular, the block diagram modeling environment can be configured such that the simulation results reproduce the effect of the real-time scheduler's mode of operation. For example, an algorithm that is configured to run in a single-tasking execution environment may behave differently to the same algorithm when it is configured to run in a multi-tasking environment.

Conventional scheduling schemes work when a processor is nominally loaded, but may fail if the processor becomes overloaded. When a task is required to perform extra processing and takes longer than normal to execute, it may be scheduled to execute before a previous instance of the same task has completed. This is referred to as a task overrun. On occurrence and detection of a task overrun, the scheduler must take appropriate action. For example, one possible course of action is to record that a failure has occurred and reset the application. Alternatively, it is possible to implement a less drastic course of action that does not force a reset of the real-time system and allows operation to continue, for example, to skip execution of the task that is scheduled to execute before the previous instance is complete.

SUMMARY OF THE INVENTION

The present invention provides graphical programming or modeling environments, such as a block diagram environment, in which graphical programs or models can be created, simulated and/or executed in real-time. The present invention may provide mechanisms for automatically generating code for the graphical programs/models. The automatically generated code may be executed in a real-time system by single-tasking or multi-tasking. In the multi-tasking, each task may be prioritized for execution.

In one embodiment, the present invention may provide a real-time scheduler for scheduling the execution of tasks on the real-time system. The scheduler may allow task overruns in the execution of the tasks on the real-time system. The task overruns may occur when the execution of a task for a current sample hit is not completed before a next sample hit. When the task overruns occur, the execution of the tasks is adapted to catch up the normal execution of the tasks. In an embodiment, the scheduler may delay the execution of the task for the next sample hit until the execution of the task for the current sample hit is completed. The execution of the task for the next sample hit is performed after the execution of the task for the current sample hit is completed. Alternatively, the execution of the task for the next sample hit that cannot be scheduled at its desired time may be canceled.

In another embodiment, the present invention may execute the graphical programs or models to emulate the task overrun that may occur in the execution of the graphical programs or models in a real-time system. The embodiment may enable users to input information relating to the behavior in real-time execution of the graphical programs or models. The information may include task overruns in the execution of the graphical programs or models in a real-time system. The information may also include the task execution order in the execution of the graphical programs or models in a real-time system. In one embodiment of the present invention the graphical programs or models are executed using the information on the behavior of the graphical programs or models executed in the real-time execution.

In accordance with one aspect of the present invention, a method or a medium holding instructions for the method is provided for executing a model in a real-time system. The method includes the step of creating a model in a modeling environment. The method also includes the step of generating code for the model, wherein the code includes a scheduler portion for scheduling an execution of the code on the real-time system. The method further includes the step of executing a portion of the code on the real-time system periodically at one or more rates, wherein the scheduler portion allows overruns in the execution of the portion of the code on the real-time system.

In another aspect of the invention, a method or a medium holding instructions for the method is provided for executing a model in a modeling environment. The method includes the step of creating a model in the modeling environment. The method also includes the step of receiving information on a behavior of the model in a real-time execution. The method further includes the step of executing the model based on the information on the behavior of the model in a real-time execution.

In another aspect of the invention, a system is provided for executing a model in real-time. The system includes an editor for creating a model in a modeling environment. The system also includes a code generator for generating code for the model. The system further includes a scheduler for scheduling an execution of the code in real-time. The scheduler allows overruns in the execution of a first portion of the code in real-time, wherein the first portion of the code is executed in real-time periodically at a first rate.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1A:
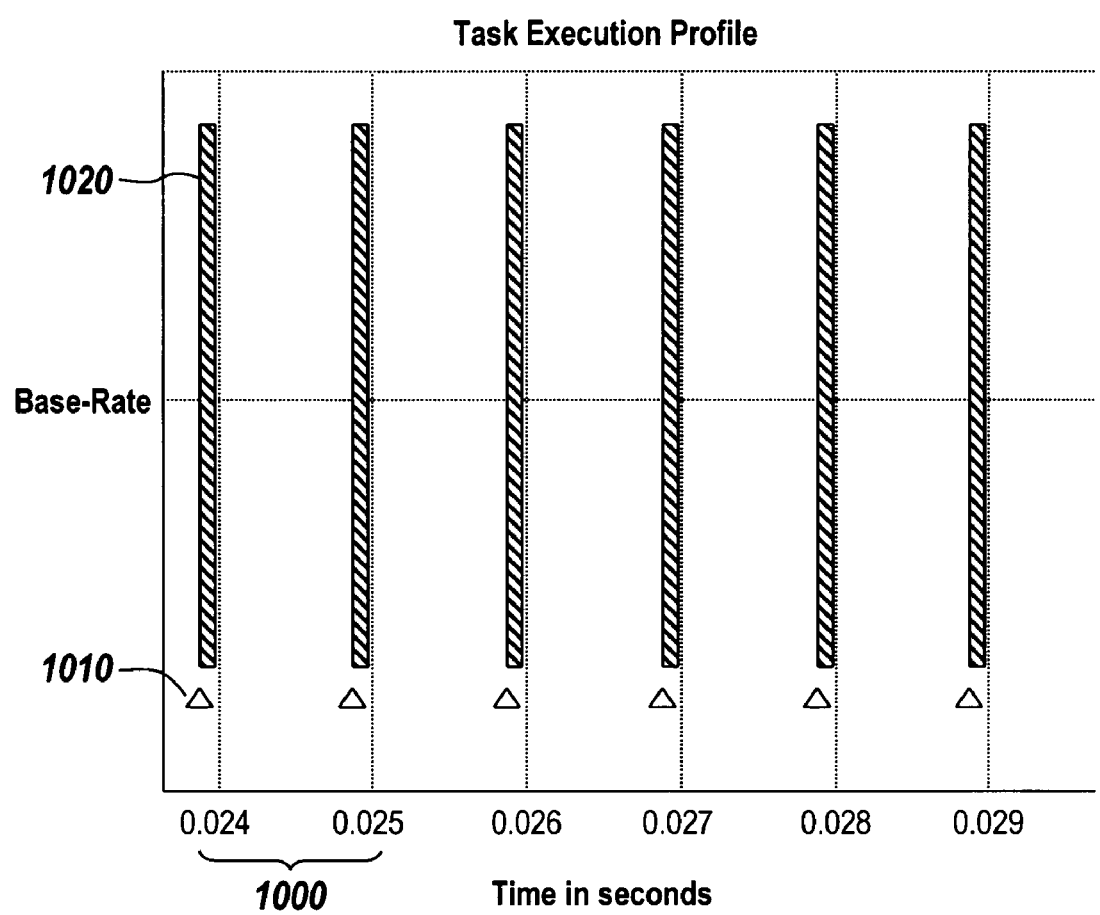
FIGS. 1A-1C show exemplary task execution schemes for executing single-rate or multi-rate systems.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a block diagram modeling environment in which a block diagram is created, simulated or executed in real-time. The illustrative embodiment will be described below solely for illustrative purposes relative to a time-based block diagram environment. Although the illustrative embodiment will be described relative to the time-based block diagram environment, one of skill in the art will appreciate that the present invention may apply to other graphical programming/modeling environments, including state-based and flow diagram environments, data flow diagram environments and Unified Modeling Language (UML) environments, as long as the graphical model has some notion of semantics that allows it to be transformed into an executable for a computer processor/microcontroller or directly synthesized in application-specific hardware.

The illustrative embodiment will be described below relative to a Simulink® model, a time-based block diagram found in Simulink® from The MathWorks, Inc. of Natick, Mass. Nevertheless, those of skill in the art will appreciate that the present invention may be practiced relative to models implemented in other graphical modeling environments, including but not limited to LabVIEW from National Instruments Corporation of Austin, Tex., Dymola from Dynasim AB, of Lund, Sweden, and Rational Rose from IBM of White Plains, N.Y.

The illustrative embodiment of the present invention automatically generates code for the block diagram. The generated code may be executed on a real-time system by single-tasking or multi-tasking. In the multi-tasking, each task may be prioritized for execution. The illustrative embodiment provides a real-time scheduler for scheduling the execution of tasks on the real-time system. The scheduler may allow task overruns in the execution of the tasks on the real-time system. The task overruns may occur when the execution of a task for a current sample hit is not completed before a next sample hit. When the task overruns occur, the scheduler may delay the execution of the task for the next sample hit until the execution of the task for the current sample hit is completed. The execution of the task for the next sample hit is performed after the execution of the task for the current sample hit is completed. Those of ordinary skill in the art will appreciate that there are other alternatives for handling the execution of the task for the next sample hit, such as canceling the execution of the task for the next sample hit.

The illustrative embodiment may execute the block diagram to emulate the task overruns in the execution of the block diagram on a real-time system. The illustrative embodiment may enable users to input information on the behavior of the real-time execution of the block diagram. The illustrative embodiment may provide a user interface that enables users to input the information. The information may request arbitrary delays in execution of portions of the block diagram. The information may request out of order execution of portions of the block diagram. The information may include task overruns in the execution of the block diagram in the real-time system. The information may also include the order of tasks executed on the real-time system. The illustrative embodiment executes the block diagram using the information on the behavior of the block diagram in the real-time execution.

Figure 2A:
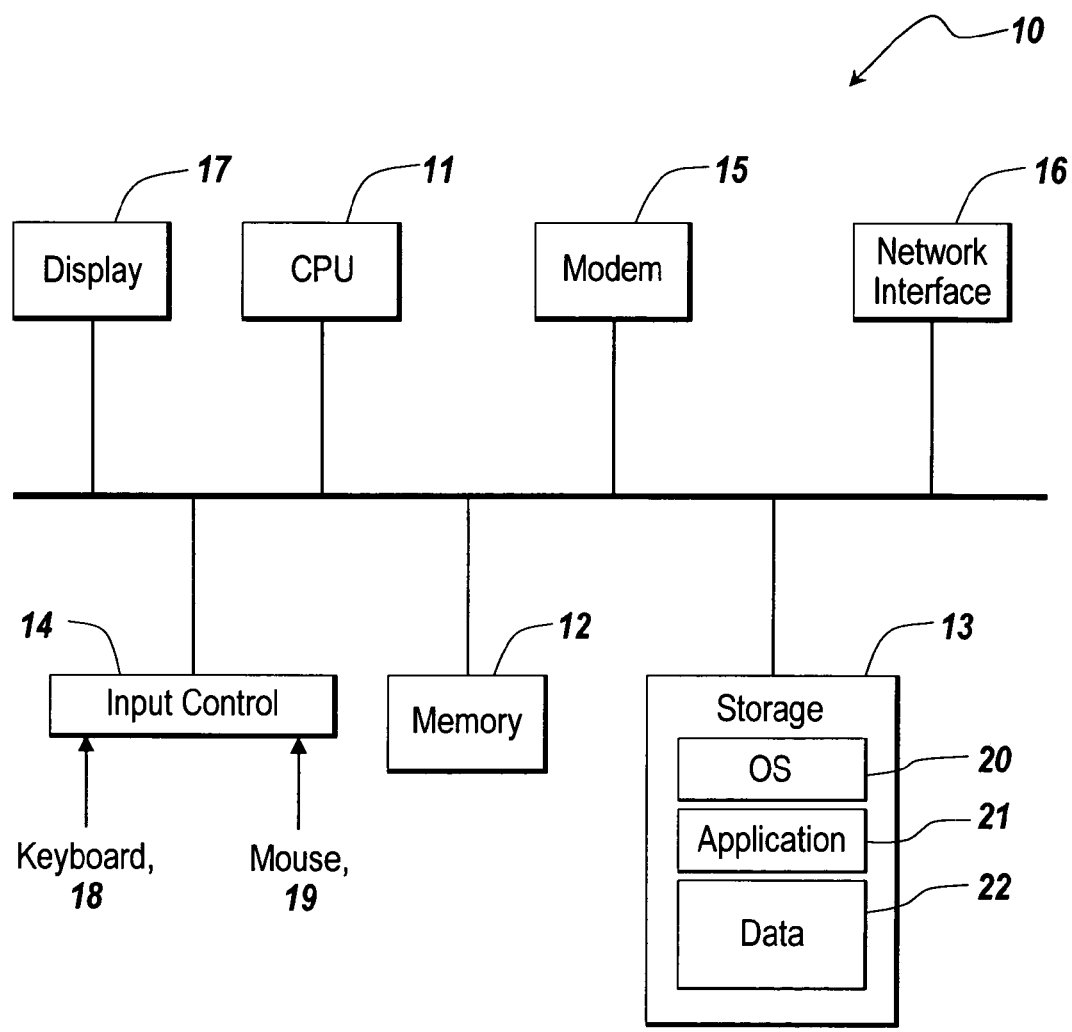
FIG. 2A shows an exemplary computing device suitable for practicing the illustrative embodiment of the present invention.

FIG. 2A is an exemplary computing device 10 suitable for practicing the illustrative embodiment of the present invention, which provides a block diagram environment. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include a Central Processing Unit (CPU) 11, memory 12, storage 13, an input control 14, a modem 15, a network interface 16, a display 17, etc. The CPU 11 controls each component of the computing device 10 to provide the block diagram environment. The memory 12 temporarily stores instructions and data and provides them to the CPU 11 so that the CPU 11 operates the computing device 10 and runs the block diagram environment. The storage 13 usually contains software tools for applications. The storage 13 includes, in particular, code 20 for the operating system (OS) of the device 10, code 21 for applications running on the operation system including applications for providing the block diagram environment, and data 22 for block diagrams created in the block diagram environment. Those of ordinary skill in the art will appreciate that the application can be stored in the memory 12 as well, much like the data, and even the OS, or they can be stored on the network described below with reference to FIG. 2B.

The input control 14 may interface with a keyboard 18, a mouse 19, and other input devices. The computing device 10 may receive through the input control 14 input data necessary for creating block diagrams, such as the selection of the attributes and operations of component blocks in the block diagrams. The computing device 10 may also receive through the input control 14 input data necessary for controlling the execution of the block diagrams. The computing device 10 may display in the display 17 user interfaces for the users to create or edit the block diagrams.

Figure 1B:
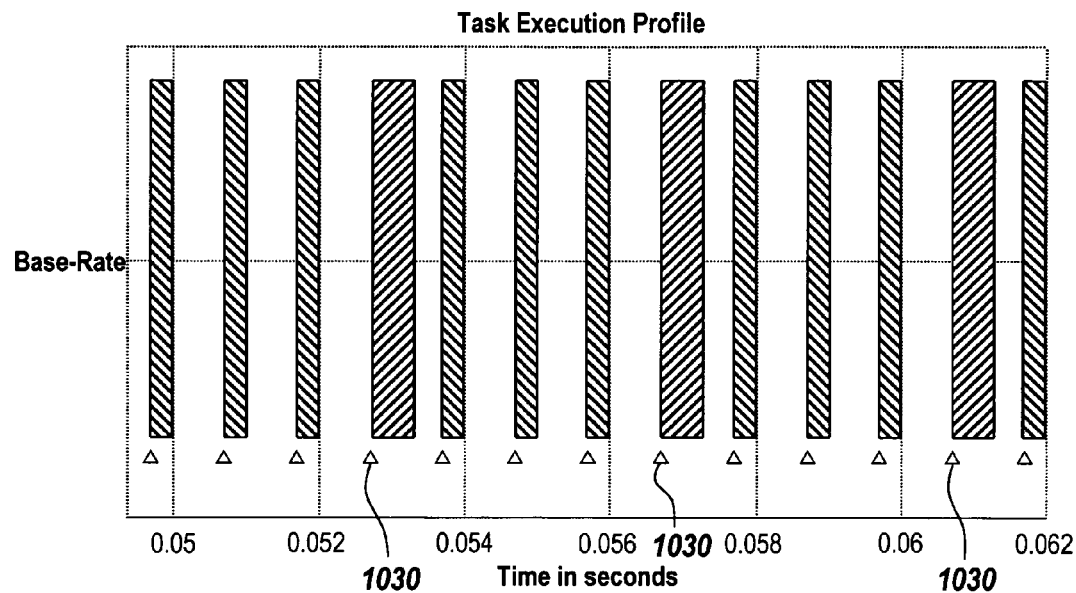
Figure 1C:
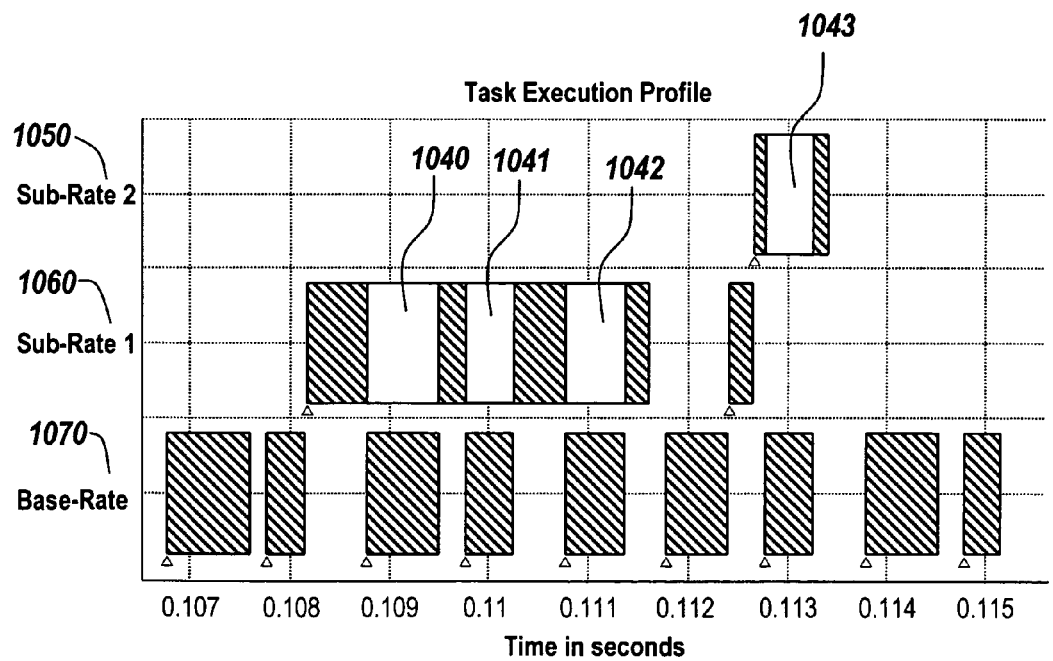
Figure 2B:
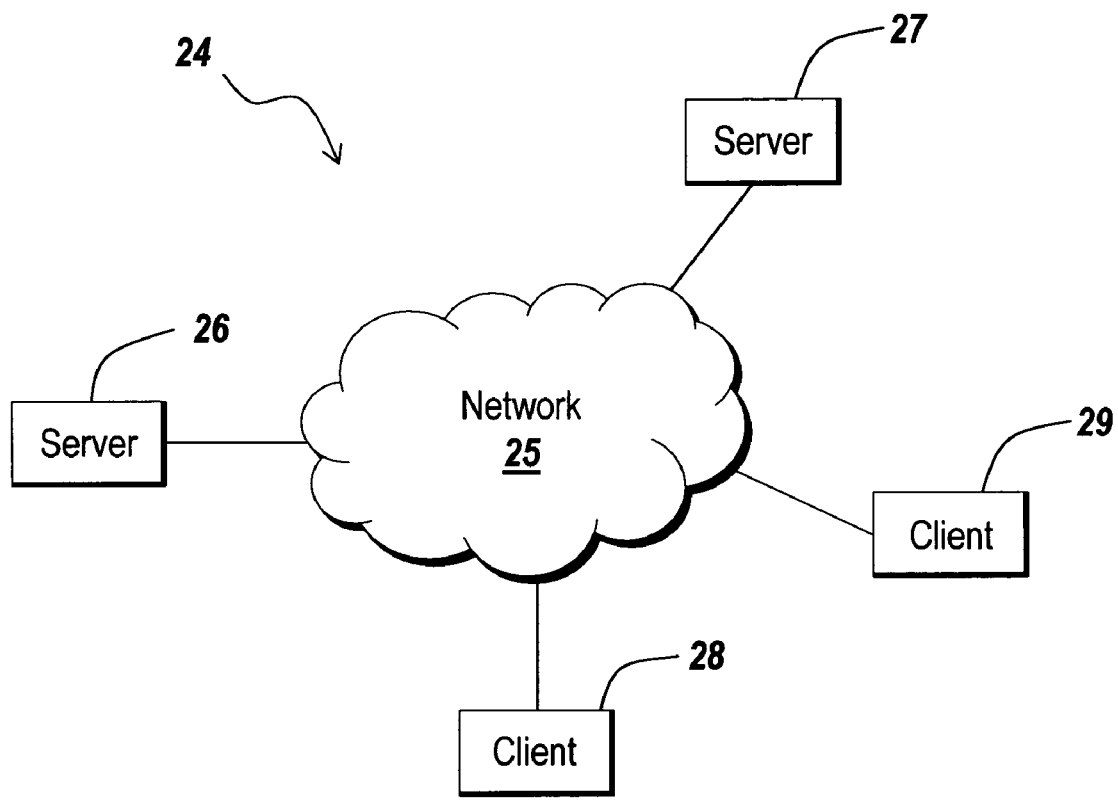
FIG. 2B shows an exemplary network environment suitable for practicing the illustrative embodiment of the present invention.

FIG. 2B is an exemplary network environment 24 suitable for a distributed implementation of the illustrative embodiment. The network environment 24 may include one or more servers 26 and 27 coupled to clients 28 and 29 via a communication network 25. The servers 26 and 27 and clients 28 and 29 can be implemented using the computing device 10 depicted in FIG. 1. The network interface 16 and the modem 15 of the computing device 10 enable the servers 26 and 27 to communicate with the clients 28 and 29 through the communication network 25. The communication network 25 may include Internet, intranet, LAN (Local Area Network), WAN (Wide Area Network), MAN (Metropolitan Area Network), etc. The communication facilities can support the distributed implementations of the present invention.

In the network environment 24, the servers 26 and 27 may provide the clients 28 and 29 with software components or products under a particular condition, such as a license agreement. The software components or products may include those for providing a block diagram environment and a block diagram created in the block diagram environment.

Figure 3:
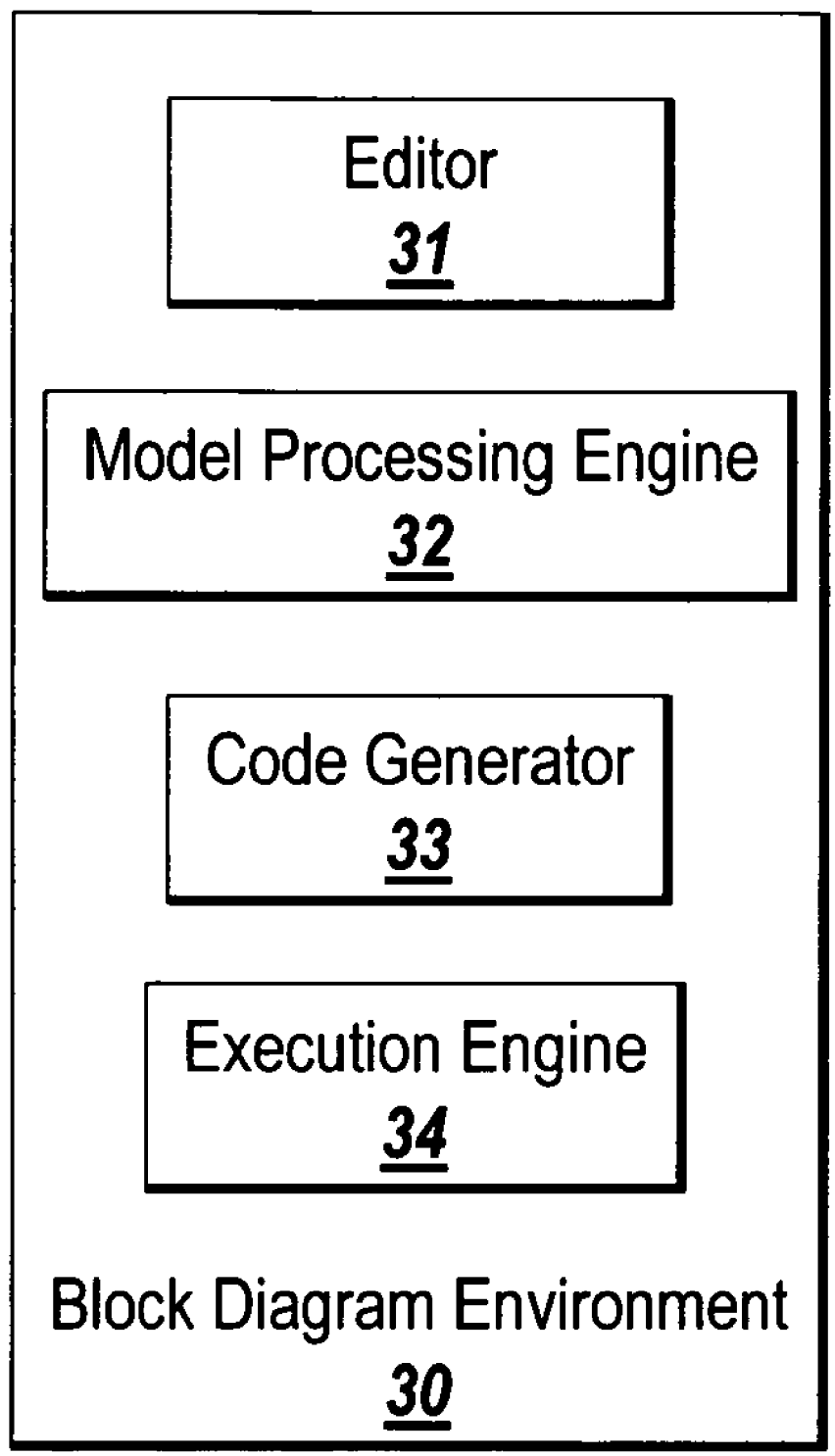
FIG. 3 depicts an exemplary block diagram environment provided in the illustrative embodiment of the present invention.

FIG. 3 depicts an exemplary block diagram environment 30 provided in the illustrative embodiment. The block diagram environment 30 may include an editor 31, a model processing engine 32, a code generator 33, and a model execution engine 34. Each element of the block diagram environment 30 will be described below in more detail. An exemplary block diagram environment 30 can be provided by the software products, such as Simulink® from The Mathworks, Inc. of Natick, Mass., that cater to various aspects of dynamic system analysis and design. Such products allow users to perform various types of tasks including constructing system models through a user-interface that allows drafting block diagram models, allowing augmentation of a pre-defined set of blocks with custom user-specified blocks, the use of the block diagram model to compute and trace the temporal evolution of the dynamic system's outputs ("executing" the block diagram), and automatically producing either deployable software systems or descriptions of hardware systems that mimic the behavior of either the entire model or portions of it (referred to herein as "code generation"). Although the discussion contained herein focuses on Simulink® from the MathWorks, Inc. of, Natick Mass., those skilled in the art will recognize that it is applicable to other block modeling software applications. Those skilled in the art will recognize that the code generator 33 can be integrated within other elements, such as the model processing engine 32. Those skilled in the art will also recognize that the code generator 33 may not be needed in some embodiments of the present invention, such as the interpretive execution mode, which will be described below in the "Code Generation of the Block Diagram" portion.

Figure 4:
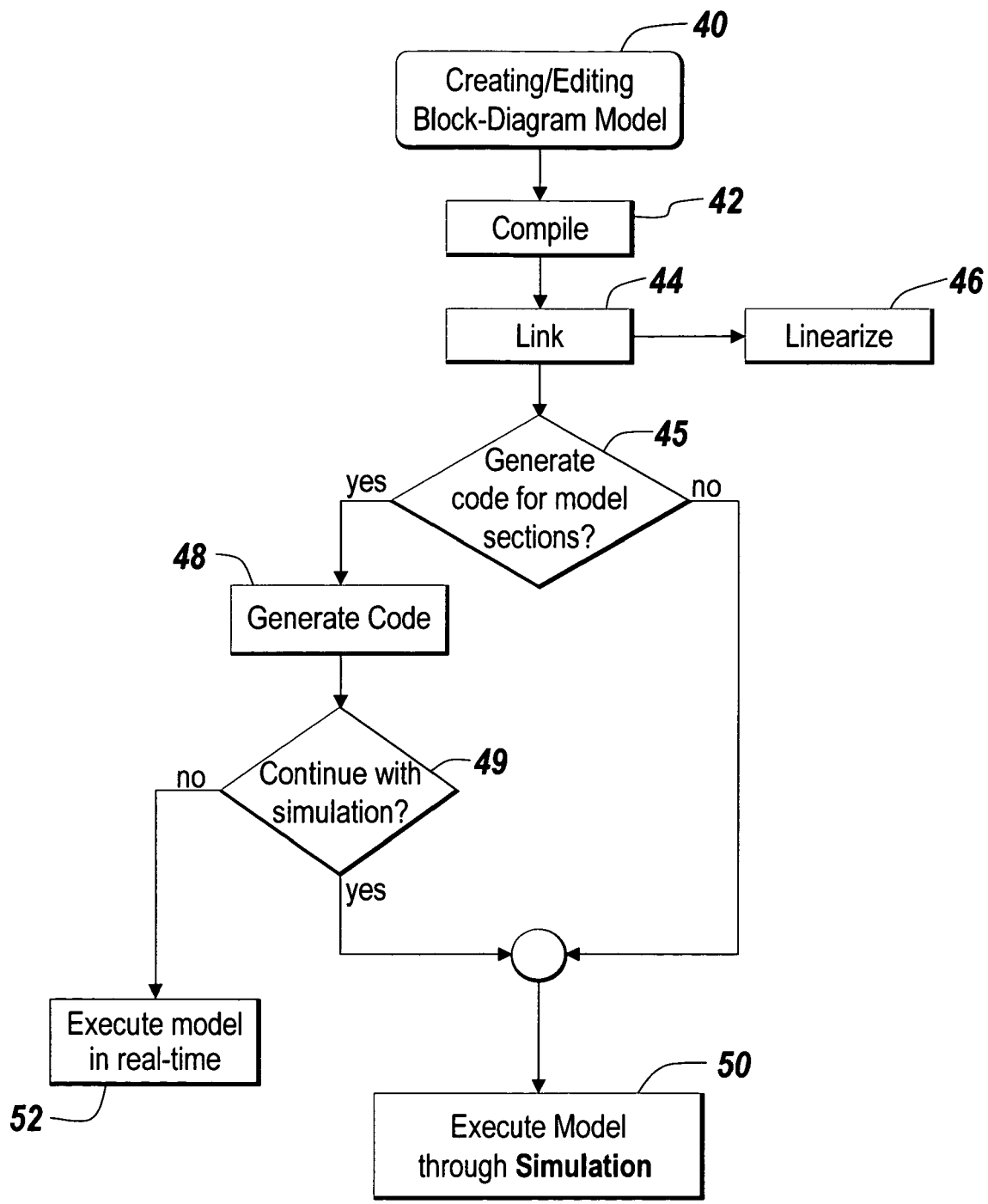
FIG. 4 is a flow chart showing an exemplary operation of the block diagram environment.

FIG. 4 depicts an exemplary operation of the block diagram environment 30. The block diagram is created or edited (step 40) and compiled (step 42). Following the compilation stage, is the model link stage (step 44) which may also produce linear models (step 46). Code may or may not be generated (step 45). If code is generated (step 48), a decision is made (step 49) whether to continue the simulation. If the decision is made to continue the simulation, the model is executed through the simulation (step 50). If the simulation is not continued, the code may be delivered to a real-time system and executed in real-time (step 52). Those of ordinary skill in the art will appreciate that the real-time execution (step 52) and simulation (step 50) are illustrative modes for executing the code and the code can be executed in other modes, such as a non-real time execution mode using processor-in-the-loop evaluation. If code is not generated, the block diagram may execute in interpretive mode (step 50), which will be described below in more detail.

Creation of the Block Diagram

The editor 31 enables users to create and/or edit the block diagram in the block diagram environment 30. The block diagram editor 31 allows users to perform such actions as draw, edit, annotate, save, and print out block diagram representations of dynamic systems. Blocks are the fundamental mathematical elements of a classic block diagram model.

A typical base data-structure for a block may be represented as:

```
class Block {
    public:
            // Access methods for setting/getting block data
        ...
            // Methods for block editing
            virtual ErrorStatus BlockDrawIcon( );
            virtual BlockParameterData BlockGetParameterData( );
        ...
            // Methods for block compilation
        ...
            // Methods for block execution
            .........................................
            virtual ErrorStatus BlockOutput( )      = 0;
            virtual ErrorStatus BlockDerivative( ) = 0;
            virtual ErrorStatus BlockUpdate( )      = 0;
        ...
    private:
            BlockGraphicalData blkGraphicalAttributes;
            BlockFunctionalData blkFunctionalAttributes;
            BlockCompiledData blkCompiledAttributes;
            BlockExecutionData blkExecutionData;
        ...
};
```

Although the example of the data structure above is written in C++, those skilled in the art will recognize that equivalent data structures written in other languages may also be used. The major data fields of the block data structure fall into four categories including a graphical attributes field, a functional attributes field, a compiled attributes field and an execution data field.

The graphical attributes field is responsible for storing information relevant for graphical rendering of the block within its parent block diagram's GUI. Attributes specific to the block icon, such as font, color, name, and icon-image, are stored in this field. It should be noted that modifying these attributes does not affect the dynamics of the model using this block.

The functional attributes field is responsible for specifying block attributes that may potentially affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of a given block in a model.

The compiled attributes field of the block data structure holds the attributes of the block and its ports that mirror the functional attributes listed above. This field is filled in during block diagram compilation by utilizing the functional attributes of the block in conjunction with the functional and compiled attributes of the blocks that are connected to it. This process of determining the compiled attributes from the functional attributes is termed attribute propagation. One of ordinary skill in the art will appreciate that there may be compiled properties that do not result from attribute propagation. Attribute propagation is described in greater detail below in connection with block diagram compilation.

The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the block diagram editor 31 in order to render the block appropriately in the GUI of its parent block diagram. For instance, this set of methods may include a BlockDrawIcon method that determines the shape the block icon has on the GUI. Methods used in compilation are methods that are called by the block diagram compilation engine 32. They help validate the connections of the block to other blocks on the block diagram. The methods used in execution include a number of different run-time methods that are required for execution.

Once a block diagram model has been constructed using the editor 31, the model is solved in order to trace the system outputs as a function of time. The solution of the model, which may be referred to as model execution, is carried out from a user-specified input time for a set of user-specified inputs. Execution/Simulation proceeds in following stages: compilation, link, code generation, and the execution/simulation.

Compilation of Block Diagram

The processing engine 32 carries out the task of compiling the block diagram to produce an "in-memory executable" version of the model that is used for generating code and/or simulating, executing, or linearizing a block diagram model. There is also trim analysis that users can do, in addition to execution and linearization. In principle, any number of analysis methods are possible on a block diagram model of a dynamic system, other than execution. The compile stage involves checking the integrity and validity of the block interconnections in the block diagram. In this stage, the engine 32 also sorts the blocks in the block diagram into hierarchical lists that are used when creating the block method execution lists. In the link stage, the processing engine 32 uses the result of the compiled stage to allocate memory needed for the execution of the various components of the block diagram. The linking stage also produces block method execution lists that are used by the execution or linearization of the block diagram. Included within the link stage is the initialization of the model which consists of evaluating "setup" methods (e.g. Block Start, Block Initialize, Enable, and ConstantOutput methods). The block method execution lists are generated because the execution and/or linearization of a model must execute block methods by type (not by block) when they have a sample hit.

The compile stage involves preparing data structures and evaluating parameters, configuring and propagating block characteristics, determining block connectivity, and performing block reduction and block insertion. The preparation of data structures and the evaluation of parameters creates and initializes basic data-structures needed in the compile stage. For each of the blocks, a method forces the block to evaluate all of its parameters. This method is called for all blocks in the block diagram. If there are any unresolved parameters, execution errors are thrown at this point.

During the configuration and propagation of block and port/signal characteristics, the compiled attributes (such as dimensions, data types, complexity, or sample time) of each block (and/or ports) are setup on the basis of the corresponding functional attributes and the attributes of blocks (and/or ports) that are connected to the given block through lines are based on model attributes such as the solver step size. If it is the solver step size that determines a block's sample rate, it is not set based on 'attribute propagation,' as is mentioned earlier. The attribute setup is performed through a process during which block functional attributes "ripple through" the block diagram from one block to the next following signal connectivity. This process (referred to herein as "propagation"), serves two purposes. In the case of a block that has explicitly specified its block (or its ports') functional attributes, propagation helps ensure that the attributes of this block are compatible with the attributes of the blocks connected to it. If not, an error is issued. For instance, if an Integrator block is implemented to only accept numbers of double precision data type, then this block will error out if it is driven by a block that produces single precision data, unless the user has asked for an implicit data conversion. Secondly, in many cases blocks are implemented to be compatible with a wide range of attributes. Such blocks adapt their behavior in accordance with the attributes of the blocks connected to them. This is akin to the concept of polymorphism in object-oriented programming languages. For instance, a discrete-time Filter block could be implemented to accept any of the standard integer data types ranging from 8-bit to 128-bit. The exact implementation of the block is chosen on the basis of the specific block diagram in which this block finds itself. Included within this step are other aspects such as validating that all rate-transitions within the model yield deterministic results and that the appropriate rate transition blocks are being used.

The compilation step also determines actual block connectivity. Virtual blocks play no semantic role in the execution of a block diagram. In this step, the virtual blocks in the block diagram are optimized away (removed) and the remaining non-virtual blocks are reconnected to each other appropriately. This compiled version of the block diagram with actual block connections is used from this point forward in the execution process Once actual block connectivity has been determined (by removing the virtual blocks) the block diagram may be further optimized by performing block reduction and insertion. During this step, non-virtual blocks may be inserted or a set of non-virtual blocks may be completely removed or reduced to a single equivalent block. Block insertion and reduction is mainly done to improve execution efficiency. Examples of block insertion and reduction include the removal of Gain blocks whose gain value is 1. A Gain block is a block that multiplies its input value by a gain parameter, such as a simple amplifier. A signal copy block may also be automatically inserted in order to make contiguous memory copies of signals that are made up of disjoint memory sections. Block insertion and reduction may also be performed at other suitable stages of compilation.

The first step in sorting involves transforming the graphical block diagram into a compiled (in-memory) directed graph consisting of edges and vertices. The vertices are derived from some of the non-virtual blocks. For instance, virtual and reduced blocks do not appear in the directed graph. The edges represent data dependencies between the vertices. The data dependencies do not correspond to the signals in the block diagram. For example, all signals that connect to input ports without direct feed through are "cut" or ignored. In addition, data dependencies are added to capture implicit dependencies. For example, all inputs to a Function-Call subsystem are implicit data dependencies to the owner (caller) block.

Sorting must also take into consideration other user specified dependencies between the blocks. These dependencies include the concepts of priorities and placement groups. A block priority specifies the order in which the equations associated with a block are evaluated with respect to other blocks. Placement groups are a way of causing each class of block methods for a specified set of blocks to be "placed together" in the block method execution lists. The terms "data dependency" or "data precedence" as used herein refer to the edges of the compiled directed graph and not the signals found within a block diagram. Attempting to correlate data dependencies directly to the signals found within a block diagram is incorrect and leads to the conclusion that Simulink® does not satisfy data dependencies, i.e., the execution of the operations or block methods does not satisfy data dependencies if one interprets signal connectivity as specifying data dependencies.

The link stage commences after compilation. During this stage physical memory allocations are made in order to prepare for execution. Buffers are allocated for block input and output data buffers, states, and work areas. Additionally, block method execution lists that are derived from the sorted list allow for execution of the block diagram. Each block method execution list is a list of block methods that are to be executed in a sequence when each method within the list has a sample hit. There is generally a set of block method execution lists associated with each layer of the block diagram that corresponds to a non-virtual subsystem. Non-virtual subsystems are either defined by the user or automatically synthesized during compilation to either efficiently execute the model or simplify the implementation of the semantics defined by Simulink®. In multi-tasking mode, the lists within each layer may be further partitioned when block diagrams have blocks with different sample rates. These lists are explained in greater detail below.

Those skilled in the art will recognize that while the block method execution lists are derived from the sorted list, they do not necessarily correspond one-to-one with the sorted lists. First, each block method execution lists contains only blocks that have such a block method of the given type (class) defined by the list. Second, block methods corresponding to components such as the function-call subsystem do not appear on the block method execution lists because they are executed by an "owner" block.

Although included in the discussion of the compilation stage, it is not required that the time-based diagram perform the block sorting step during compilation. The sorting step is performed to achieve efficient execution. Ignoring efficiency, there is no semantic reason to perform the sorting step. Any random ordering of the block methods will work. In fact, any ordering of all block method execution lists except the Output block method execution list will result in the same level of efficiency. Randomly re-ordering the Output block method execution list will yield correct answers. If the Output block method list is randomly ordered, then the Simulation engine, when executing the Output block method execution list, continues sequencing through the Output block method execution list at each point in time until there are no changes in signal values.

Similarly included within the linking stage for the sake of simplicity, is the memory initialization of the model. The memory initialization of the model includes invoking block start, initialize, constant initialize, enable, and constant output methods. These are examples of some of the block methods that are used during model setup (prior to execution) to initialize the "state" of the system so that execution or linearization can commence.

Code Generation for the Block Diagram

The compiled and linked version of the block diagram may be directly utilized to execute the model over the desired time-span. This interpretive mode of execution is suitable for getting fine-grained signal traceability. It should be noted that the traceability associated with interpretive execution comes at the price of increased overhead in the form of additional execution-related data-structures and messaging in the engine. An alternative to the interpretive execution mode is to utilize the generated-code created by code generator 33, such as the Real-Time Workshop tool for Simulink® models. In this mode, the code generator 33 translates a selected portion of the block diagram (or the entire block diagram itself) into code. Such code could be in a number of possible forms. The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

If the code is generated, then the stages that follow use the generated code during the execution of the block diagram. If this stage is skipped, then the execution engine 34 uses an interpretive mode of execution for the block diagram. Execution of generated code can be more efficient than interpretive execution because of fewer data-structures and lesser internal messaging in the engine, although the increased efficiency generally comes at the cost of decreased execution traceability. Additionally, models can be tested directly in a real-time system thereby making prototyping of new systems fast and cost-effective. For instance, consider the design of a controller for an anti-lock braking system of a car. The dynamics of the braking system can be executed in the interpretive mode in the block diagram. The controller itself can be implemented on a hardware micro-controller to test the efficiency of the control laws implemented within. Note that for such teal-time execution, it is normally necessary for the time span over which a model is executed by the software to match real-world time. In other words, the software must allow real-time execution of the block diagram model. Those skilled in the art will recognize that when users generate code, they may choose to take the code and deploy it to the real-time system. Although the embedded application is described relative to real-time execution in the illustrative embodiment, one of skill in the art will appreciate that the present invention may apply to embedded applications using nonreal-time execution, such as processor-in-the-loop execution.

Real-Time Execution of the Block Diagram

Figure 5:
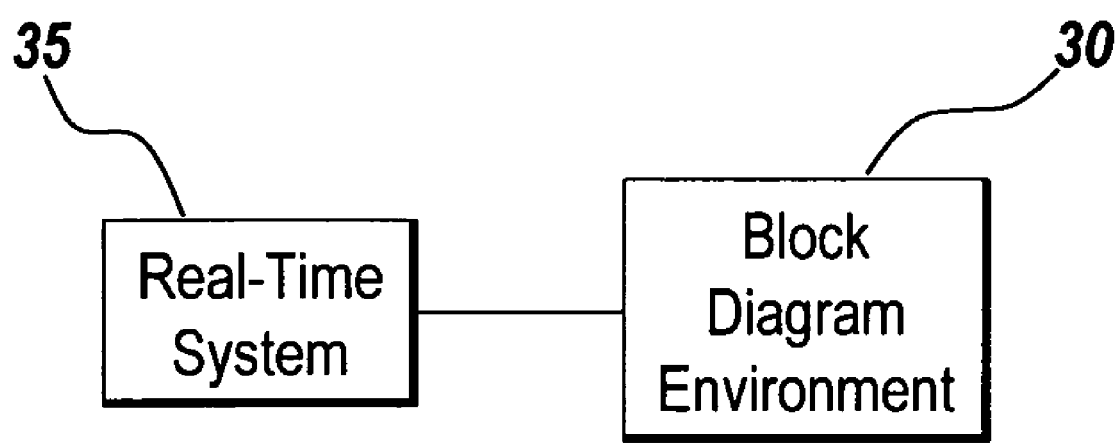
FIG. 5 depicts an exemplary real-time system coupled to the block diagram environment.

FIG. 5 illustrates an exemplary real-time system 35 coupled to the block diagram environment 30. The real-time system 35 may include hardware systems, such as microprocessor systems, and a model or portions of a model can be executed via the generated code on the real-time system 35. Once the generated code is deployed and executed on the real-time system 35, the block diagram modeling environment 30 operates in an external mode in which the block diagram modeling environment 30 acts as a monitor and debugger of the generated code running on the real-time system. In the external mode, users can change parameters and view signals of the real-time system 35 via the block diagram modeling environment 30. Those of appreciate that the external mode is an illustrative mode for real-time execution and does not limit scope of the present invention. For example, the real-time system 35 can be completely stand-alone, and the code can be deployed to the real-time system 35. The code automatically generated the block diagram modeling environment 30 is deployed and executed on the real-time system 35.

Figure 6:
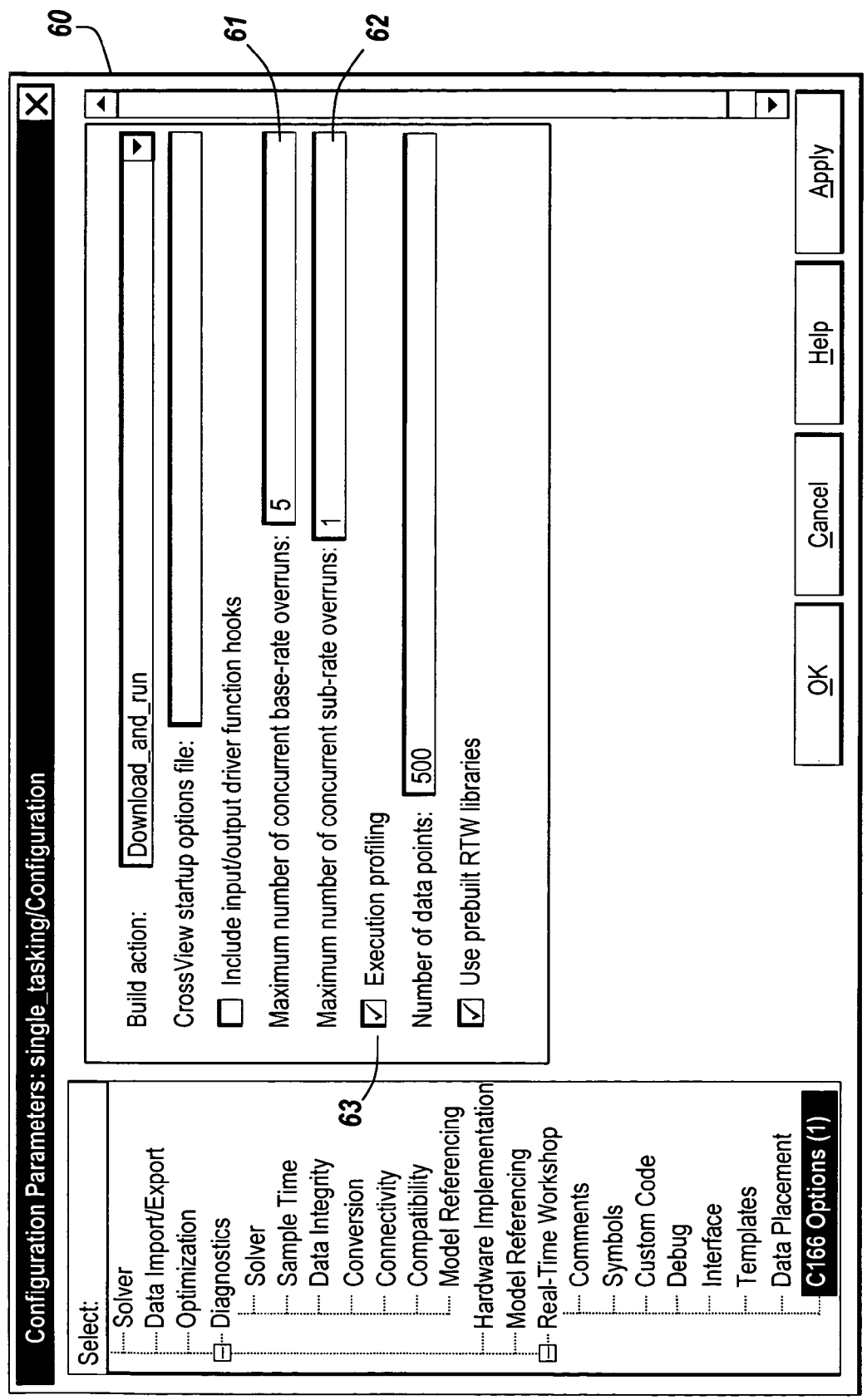
FIG. 6 depicts an exemplary user interface for configuring the code generation and real-time execution of the generated code.

In order to generate code and execute the generated code on the real-time system 35, users may set parameters to configure the code generation for the block diagram, such as the specification of the real-time system in which the generated code is executed. The users may also set parameters for configuring the execution of the generated code on the real-time system 35. FIG. 6 is an exemplary user interface 60 that enables users to set parameters for configuring the execution of the generated code in a real-time system 35. The illustrative embodiment may provide task overrun options in the user interface 60. The task overrun options enable the users to set a maximum number of concurrent base-rate overruns 61 and a maximum number of concurrent sub-rate overruns 62. Those of ordinary skill in the art will appreciate that the overrun options depicted in FIG. 6 are illustrative and other options can be provided in different embodiments, such as queuing the tasks that are due, or just canceling their execution.

The maximum number of concurrent base-rate overruns 61 and the maximum number of concurrent sub-rate overruns 62 may be used to set up the interface attributes of connections between components of the block diagram so that the overruns are allowed in the real-time execution of the block diagram. For the purpose of simulating the effect of overruns, which will be described below in more detail, additional attributes may be specified such as the frequency with which the overruns occur. Those of skill in that art will also appreciate that the values assigned for the overrun options may be indicated by line style, drop-back shading or coloring in the block diagram model.

Users can use the options for setting the maximum number of concurrent base-rate overruns 61 and the maximum number of concurrent sub-rate overruns 62 to configure the behavior of the scheduler when any of the timer based tasks do not complete within their allowed sample time. It is useful to allow task overruns in the case where a task may occasionally take longer than usual to complete (e.g. if extra processing is required when a special event occurs); if the task overrun is only occasional then it is possible for the scheduler to 'catch up' after the extra processing has been completed. If the maximum number of concurrent overruns for any task is exceeded, this may be deemed to be a failure and the real-time application is stopped. As an example, if the base rate is 1 ms and the maximum number of concurrent base-rate overruns is set to 5 then it is possible for the base rate task to run for almost 6 ms before failure occurs. Once the overrun has occurred, it is necessary for subsequent executions of the base rate to complete in less than 1 ms in order that the lost time is recovered.

If sub-rate overruns are allowed then the transfer of data between different rates (via rate-transition blocks) in the model may be affected. This causes the numerical behavior in real-time to differ from the behavior in simulation. The different behavior in simulation occurs if the simulation takes no account of the fact that overruns have occurred in real-time execution. The illustrative embodiment of the present invention may supply information on when overruns occur in real-time execution so that the behavior in simulation can be matched to the actual behavior in real-time execution, which will be described below in more detail with reference to FIGS. 10-13. To disallow sub-rate overruns and ensure that this effect does not occur, users can set the maximum number of concurrent sub-rate overruns to zero.

The illustrative embodiment may provide a utility, such as the execution profiling 63 depicted in FIG. 6, that enables users to store the task execution times. The task execution times can be loaded and used in the execution of the block diagram to emulate the real-time execution behavior of the block diagram, which will be described below in more detail with reference to FIGS. 10-13. The task execution time is that part of the time between task start and finish when the task is actually running.

Figure 7:
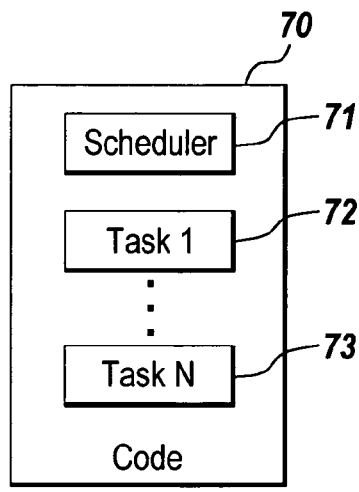
FIG. 7 depicts an exemplary code generated in the illustrative embodiment.

FIG. 7 is exemplary code 70 for a block diagram generated in the block diagram environment 30 and deployed to the real-time system 35 for real-time execution. The generated code 70 may include a portion for the real-time scheduler or real-time scheduling algorithm 71 designed to allow temporary task overruns. The code 70 may include portions for one or more tasks 72 and 73. This scheduler 71 allows tasks 71 and 73 to occasionally overrun their allotted execution time by delaying the start of the next task execution. Those of skill in the art will appreciate that the tasks 72 and 73 do not necessarily refer to different rates and the tasks 72 and 73 may be executed at the same sample time.

Exemplary code for the temporary overruns scheduler or scheduling algorithm 71 is provided as follows.

```
disable interrupts
increment base_rate_overrun_counter
if base_overrun_counter > 3
    error: too many concurrent base-rate overruns
end
if base_rate_overrun_counter > 1
    return
end
while base_rate_overrun_counter != 0
    enable interrupts
    set event flags for each sub-task that is hit
    run base-rate task
    disable interrupts
    decrement base_rate_overrun_counter
    for i = 1 to number of sub-tasks
        if hit for sub-task i
            increment sub_rate_overrun_counter[i]
            if sub_rate_overrun_counter[i] > 3
                error: too many concurrent sub-rate overruns
            end
        end
    end
end
%% sub-rate tasks
for i = 1 to number of sub-tasks
    if sub_task_running[i] == true
        return
    else
        while sub_rate_overrun_counter[i] != 0
            set running_sub_task[i] = true
            enable interrupts
            run the sub-rate task
            disable interrupts
            set running_sub_task[i] = false
            decrement sub_rate_overrun_counter[i]
        end
    end
end
```

If the code 70 is deployed to the real-time system 35, the scheduler or scheduling algorithm 71 may be placed inside a function that implements a handler for a timer interrupt in the real-time system 35. The timer is configured to generate an interrupt at a frequency equal to the model's base rate. At the start of the function, it is assumed that further timer interrupts are disabled. The above exemplary code indicates points at which timer interrupts are re-enabled within the algorithm, which allows the function to be pre-empted by new timer interrupts. If an additional timer interrupt occurs while the base-rate is already running, the base-rate overrun counter will be incremented and the interrupt handler will return to the interrupted base-rate. When this interrupted base-rate has completed its current run, the algorithm immediately runs the additional instance of the base-rate.

If a base-rate interrupt occurs while a sub-rate task is running, the function will not return but will run the base-rate and then update the task counters to see if any sub-tasks have been activated. It will then continue to the 'for each task' section of the handler, which will run each sub-task, starting with the highest priority. This process will continue until the priority corresponding to the interrupted rate occurs. The function will then return and continue with the interrupted rate. This behavior preserves monotonicity in all conditions. It also results in the possibility that multiple versions of the exemplary code can be running concurrently, however, and thus the number of stack frames could equal the number of rates plus one. Multiple invocations of a given rate will not occur at the same time, but will be queued. The italicized code is not represented explicitly in the actual code; it is inherent in the operation of the interrupts used by the functions implementing the scheduler.

This algorithm can be implemented in a number of different ways. For example, the Embedded Target for Infineon C166® Microcontrollers, from The MathWorks, Inc., implements the algorithm as an auto-generated main, with separate interrupts for each task. These interrupts are actually TRAP instructions issued by a scheduler kernel written in assembler. This means that the implementation for C. 166 differs somewhat from the exemplary code, but the behavior is the equivalent.

Figure 8:
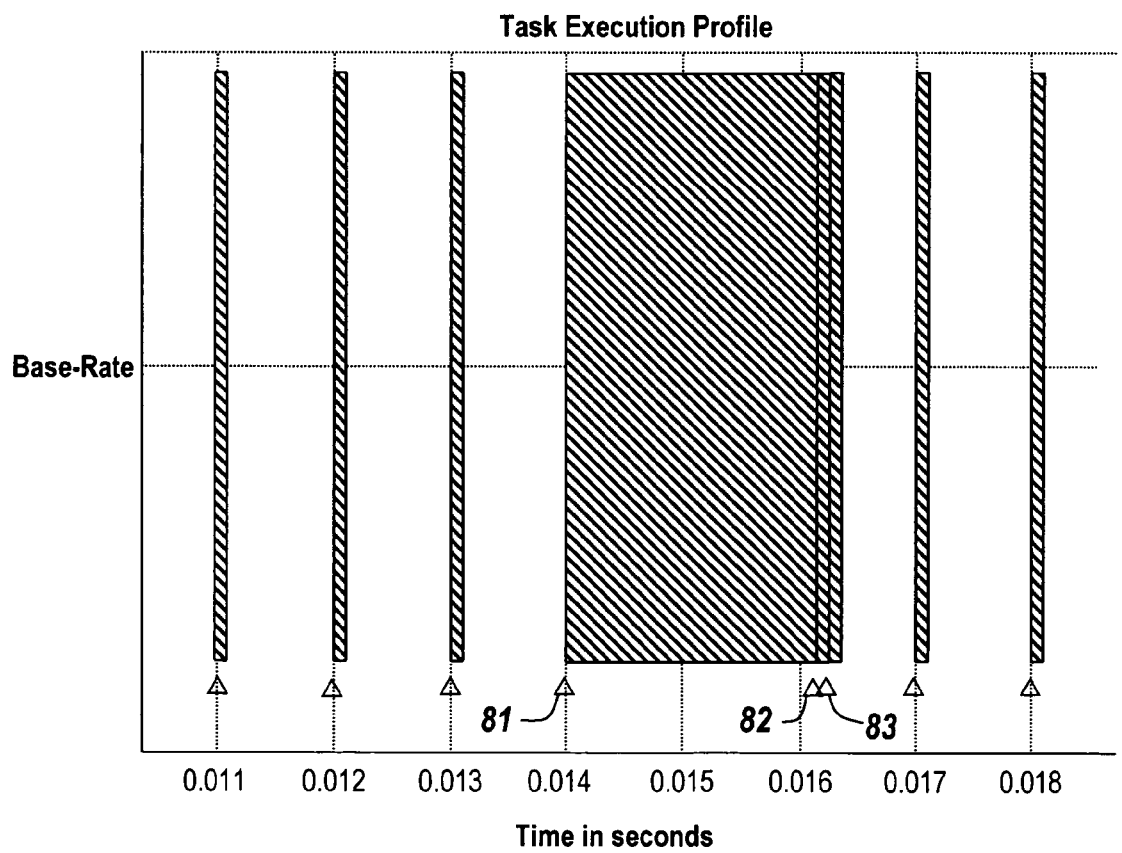
FIG. 8 depicts an exemplary operation of a task overrun scheduler in a single tasking scheme.

FIG. 8 illustrates a single-tasking execution of the code on the real-time system 35. In the single-tasking, the code 70 is executed at every sample hit. At time T=0.0014 (triangle 81), for example, the task is executed and the execution of the task is not completed until after T=0.0016. The task execution takes longer than expected on a heavily loaded processor. An overload occurs, perhaps owing to an infrequent asynchronous event. The disruption in regularly timed interrupts, denoted by triangles, indicate that the execution during this overload did not complete until the next scheduled start time of the task. In this case, the tasks execute immediately after completion in an attempt to catch up with the scheduled timer events (triangles 82 and 83). The time steps immediately after the overload are affected, but execution has recovered within two time steps.

Figure 9:
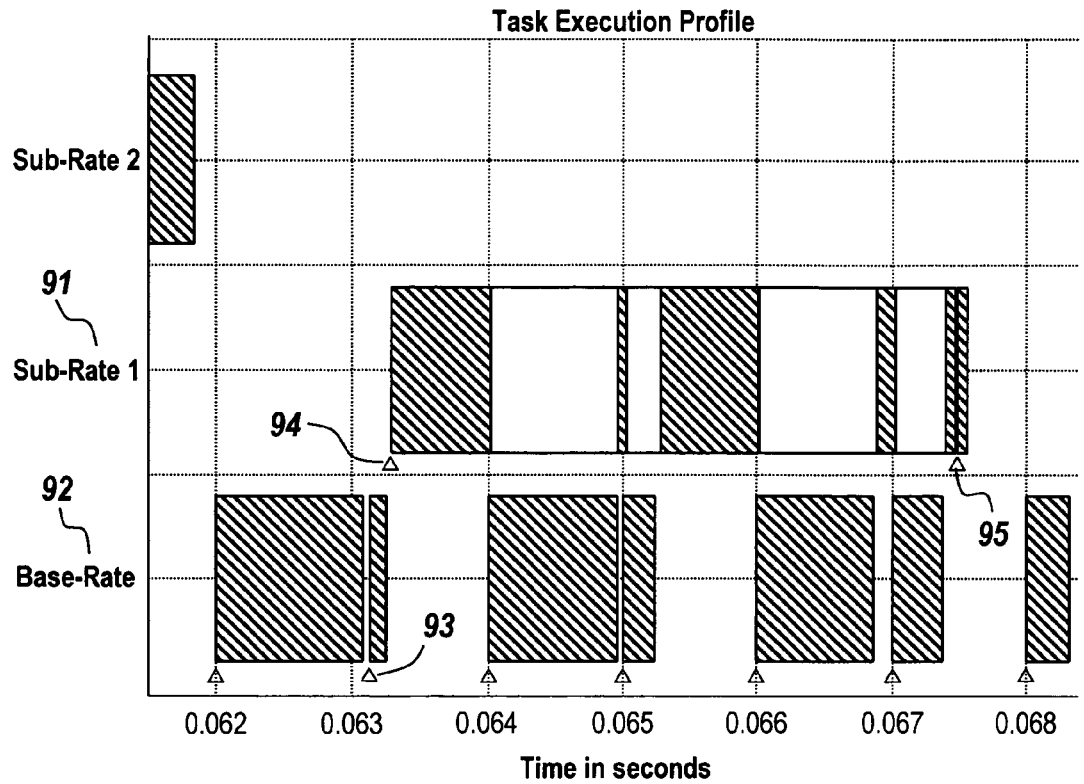
FIG. 9 depicts an exemplary operation of a task overrun scheduler in a multiple tasking scheme.

With a multi-tasking system, the scheduler maintains priority ordering, and lower-priority tasks are delayed when the execution of higher-priority tasks is requested. FIG. 9 illustrates a situation in which the execution of the second-highest priority (Sub-Rate 1) task 91 is delayed when the first-highest priority (Base-Rate) task 92 is executed. In the multi-tasking mode, a higher execution priority is placed on the faster sample time blocks than the slower sample time blocks. This prioritization is carried out by assigning Task Identification Numbers (TIDs) to each task; the higher the priority, the lower the TID. For example, a TID of 0 executes at a higher priority than a TID of 1, and so forth. The lower-priority task execution is periodically delayed by the processor loading and by task overruns in the higher-priority task. If overruns are allowed, each delayed task execution will be queued and run later. At the Base-Rate 92, the execution of the task at time T=0.062 is overrun and the next execution of the task is delayed and performed at the time after T=0.063 (triangle 93). At the Sub-Rate 1, the execution of the task beginning at the time after T=0.063 (triangle 94) is overrun and the next execution of the task is delayed and performed at the time after T=0.067 (triangle 95)

Those of skill in the art will appreciate that although the illustrative embodiment uses rate-monotonic scheduling, the present invention may use other scheduling algorithms, such as dynamic scheduling algorithms, average completion time scheduling algorithms, first come first serve scheduling algorithms, etc. For example, the task execution priorities can be dynamically modified in the dynamic scheduling algorithms.

Also, those of skill in the art will appreciate that the present invention may apply to the non-periodic or asynchronous execution of the tasks as well as the periodic or synchronous execution of the tasks. In the non-periodic or asynchronous execution of the tasks, the execution of the tasks can be scheduled at arbitrary points in time and task overruns may occur when tasks are unable to execute at scheduled points in time.

Because of the execution transitions between the faster and slower blocks in the multi-tasking mode, the multi-tasking mode requires rate transition blocks that allow the model to transition from blocks running at fast sample times to slower samples times, and vice versa. The rate transition blocks are required to correctly simulate how a multi-rate system would behave in a real-time environment. The rate-transition blocks that are configured to ensure deterministic data transfer between tasks may be affected by overruns. If overruns occur only in the base-rate task, there is no effect on the deterministic data transfer between tasks. If sub-rate overruns occur, however, deterministic data transfer is not guaranteed. In these circumstances, the behavior of the model in real time may differ from its behavior during simulation. The different behavior in simulation occurs if the simulation takes no account of the fact that overruns occur in the real-time execution. The illustrative embodiment of the present invention may supply information on when overruns occur so that the behavior in simulation can be matched to the actual behavior in real-time execution, which will be described below in more detail.

Execution of the Block Diagram

The block diagram can be executed for solving for the block diagram's outputs for a specified set of inputs over a specified span of time. During this process, the block methods (equations) corresponding to the individual blocks are executed by type following their sorted order when they have a sample hit. The illustrative embodiment may apply to the simulation of a block diagram that is partly or wholly partitioned into a number of tasks each running at the same or different sample rates. When executing in real-time, each task is assigned a priority and it is possible that a lower priority task will be pre-empted by a higher priority task. When data is transferred between tasks, the order of calculations and hence the overall system behavior, in general, depends upon the exact timing and method of scheduling all of the tasks in the system. The order of execution of tasks may be affected by the type of scheduler employed.

For example, the temporary overruns scheduler described above may cause the execution of certain tasks to be delayed relative to other higher priority tasks in the system. Typically, data is continually calculated by one task and transferred to another task: consequently a delay in execution of one task relative to another may result in changes to the data that is transferred between these tasks. This change in data passed between tasks may in turn affect the behavior of the overall system.

The illustrative embodiment achieves exactly the same numerical behavior in a non-real-time execution environment as when code is automatically generated from the block diagram model and executed in a real-time environment. The behavior of the real-time execution of the block diagram can be emulated in an interpretive mode or through code generation. If the behavior of the block diagram is simulated in an interpretive mode, the method of the illustrative embodiment for achieving the same behavior in nonreal-time execution and in real-time execution requires that information be established about the order of execution of tasks when the block diagram is executed in real-time. The information on order of task execution may be derived for any one of the following exemplary situations:

(1) it is asserted that no task will ever be pre-empted by any other task;

(2) it is asserted that no task will ever be scheduled to run while a previous instance of the same task is already running (i.e. no temporary overruns actually occur);

(3) the order of execution of all tasks is recorded over a period of time while the real-time system is executing; this may be achieved by recording the time at which an instance of any task starts to execute and the time at which it completes; (this may include cases where temporary overruns actually occurred); and (4) a test case is constructed (either manually or based on some algorithm) that defines the order of execution of tasks under a scenario where task overruns occur.

This information about the behavior of the real-time execution can be used by the execution engine 34 in the execution of the block diagram in a non-real-time modeling environment. The execution engine 34 executes tasks such that the data transfer between tasks occurs in exactly the same sequence as on the real-time system. For example, with item (4) being employed, the numerical behavior of the nonreal-time execution and the real-time execution of the system will not differ on account of differing orders of task execution although it is possible that differences may occur for other reasons such as different implementations of floating point arithmetic.

Figure 10:
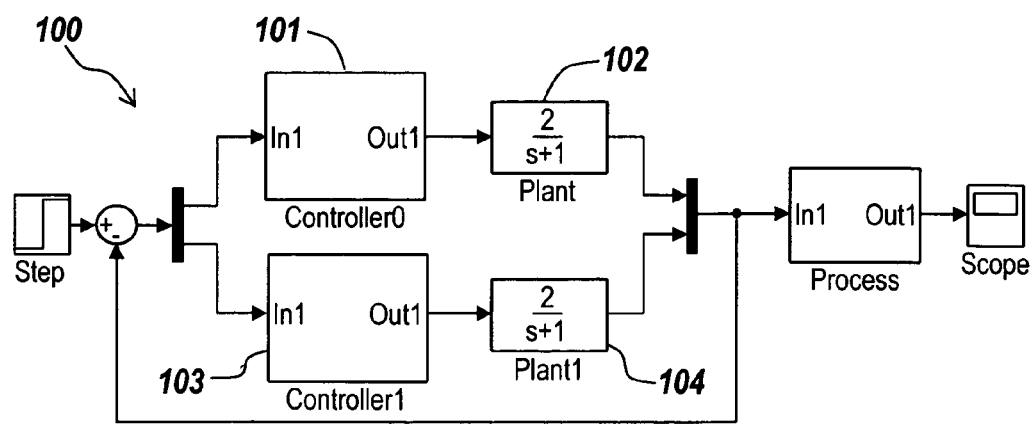
FIG. 10 is an exemplary block diagram model simulated in the illustrative embodiment.

FIG. 10 depicts an exemplary block diagram 100 simulated in the illustrative embodiment. The illustrative embodiment simulates task overrun behavior of the block diagram 100 in the real-time execution. The block diagram 100 includes two proportional-integral-derivative (PID) controllers 101 and 103 to control two plants 102 and 104. In the illustrative embodiment, both controllers 101 and 103 are executed with a sample rate of 1 [s] and their computations are executed on one processor. The controller 103 is assigned higher priority to prevent conflicts in the execution of the controllers 101 and 103.

Figure 11:
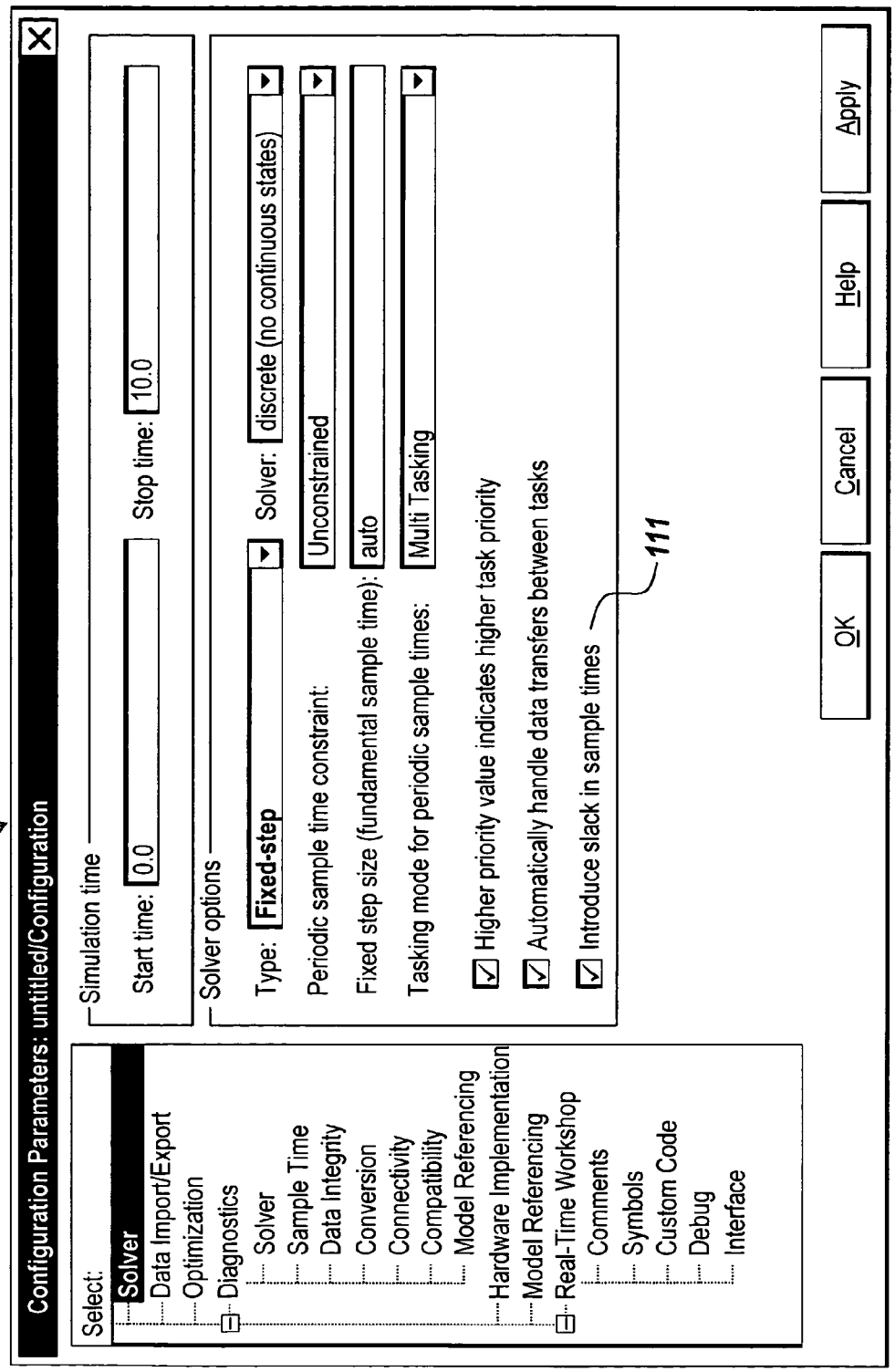
FIG. 11 depicts a user interface for configuring the simulation of the block diagram model.

When setting the simulation mode of the block diagram 100, an option may be provided to enable the users to emulate the real-time execution of the block diagram 100. FIG. 11 depicts an exemplary user interface 110 that provides a new option 'Introduce slack in sample times' 111. This option emulates task overrun behavior by occasionally using a sample time larger than the specified period, possibly for selected blocks and signals only.

Figure 12:
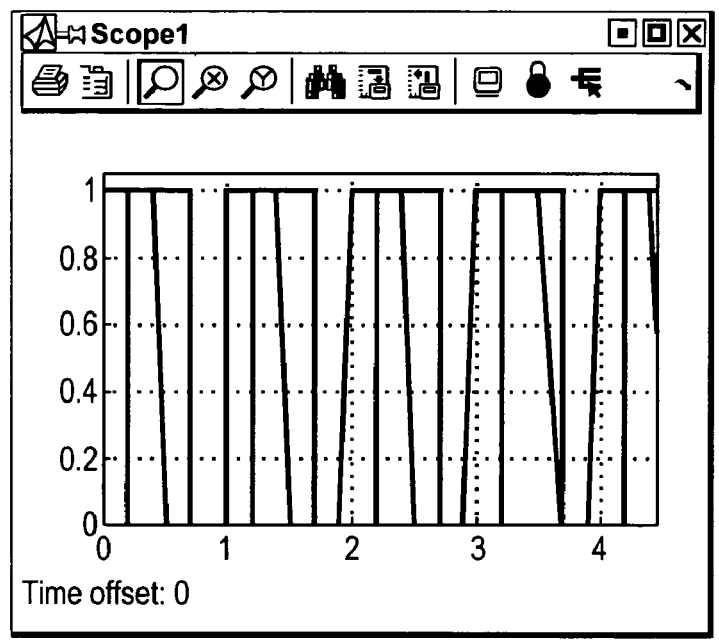
FIG. 12 depicts exemplary execution of the controllers in the block diagram model.

FIG. 12 depicts exemplary execution of the controllers 101 and 103 in the block diagram 100. At t=3.5 [s], the controller 101 is scheduled to compute its output. However, because the controller 103 takes longer to complete its outputs, the controller 101 does not have the required output value computed until t=3.65 [s], at which time the controller 101 is allowed to compute its outputs.

Figure 13:
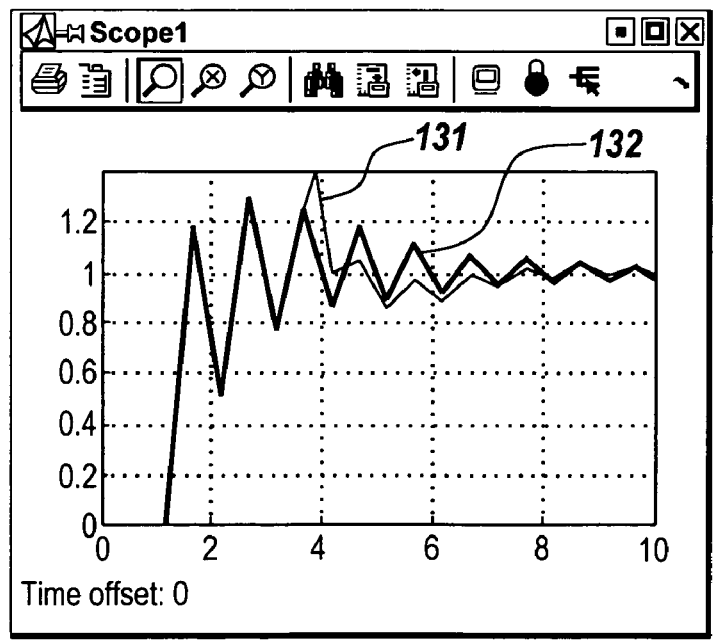
FIG. 13 depicts exemplary outputs of the plants in the block diagram model.

FIG. 13 depicts exemplary outputs of the plants in the block diagram. Because of the slight delay in computing the controller output one time, as depicted in FIG. 12, the plant behavior is distinctly different from the situation where no such slack is introduced in the execution of the block diagram. The curve 131 is the plant behavior with the slack introduced in sample times, whereas the curve 132 is the plant behavior without the slack in sample times.

Those of ordinary skill in the art will appreciate that the introducing of the slack in the sample times is an illustrative embodiment for emulating the behavior of the real-time execution of the block diagram. Instead of executing a more or less arbitrary block out of order, users can actually execute the generated code on the real-time system and record when overruns occur and how that affects the execution order. Users can force an interpretive simulation to execute the block diagram based on the recorded execution order.

Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any graphical modeling environments. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. In a computational device that provides a modeling environment, a method for executing a model in a real-time system, the method comprising:

providing a model in the modeling environment;

providing a user interface for receiving an instruction for configuring code generation from the model, the user interface including at least one task overrun option for executing code generated from the model in the real-time system;

receiving a selection via the user interface that includes one or more of the task overrun options;

automatically generating code for the model based on the instruction received via the user interface, the instruction including the selection, the generated code including a scheduler;

scheduling execution of the generated code using the scheduler, the scheduling allowing overruns during the execution; and executing the generated code in the real-time system.

2. The method of claim 1, wherein the overruns in the execution of the code occur when the execution of the code is not completed within a given time interval.

3. The method of claim 2, further comprising:

when the overruns occur in the execution of the code, delaying the execution of the code for a new time interval until the execution of the code for the given time interval is completed.

4. The method of claim 2, further comprising:

canceling the execution of the code for a new time interval.

5. The method of claim 1, further comprising:

executing a first portion of the code in the real-time system regularly; and executing a second portion of the code in the real-time system regularly, the code allowing the overruns in the execution of at least one of the first and second portions of the code in the real-time system.

6. The method of claim 5, further comprising:

when the overruns occur in the execution of the first portion of the code, delaying the execution of the second portion of the code for a new time interval until the execution of the first portion of the code for a current time interval is completed.

7. The method of claim 5, further comprising periodically executing the first portion of the code at a first rate, which is a base rate, and periodically executing the second portion of the code at a second rate, which is a sub-rate.

8. The method of claim 5, further comprising preempting the execution of the second portion of the code by the execution of the first portion of the code.

9. The method of claim 5, wherein the overruns in the execution of at least one of the first and second portions of the code change an execution order of the code.

10. The method of claim 5, further comprising:
when the overruns occur in an execution of the first portion of the code, canceling the execution of the second portion of the code for a new time interval.

11. A system for executing a model in a real-time target, the system comprising:
a storage for storing the model;
a user interface for receiving an instruction for configuring code generation from the model, the user interface including at least one task overrun option for executing code generated from the model in a real-time target;
a processor configured to:
generate code for the model based on the instruction received via the user interface, the instruction including the selection of the at least one task overrun option, and
implement a scheduler in the generated code; and
a real-time target for executing the generated code for the model, the scheduler scheduling an execution of the code and allowing overruns in the execution of a first portion of the code in the real-time target.

12. The system of claim 11, wherein the first portion of the code is executed in the real-time target periodically at a first rate.

13. The system of claim 11, wherein the overruns in the execution of the first portion of the code occur when the execution of the first portion of the code is not completed at a scheduled time of another execution of the first portion of the code.

14. The system of claim 12, wherein when the overruns occur in the execution of the first portion of the code, the scheduler delays an execution of the first portion of the code for a new time period of the first rate until the execution of the first portion of the code for a current time period is completed.

15. The system of claim 11, wherein a second portion of the code is executed in the real-time target regularly, wherein the scheduler allows overruns in the execution of the second portion of the code in the real-time target.

16. The system of claim 15, wherein the overruns in the execution of the second portion of the code occur when the execution of the second portion of the code is not completed at a scheduled time.

17. The system of claim 15, wherein when the overruns occur in the execution of the second portion of the code, the scheduler delays an execution of the second portion of the code for a new scheduled time until the execution of the second portion of the code for a current scheduled execution time is completed.

18. The system of claim 15, wherein connections between components of the model include interface attributes that allow the overruns in the execution of the first and second portions of the code.

19. The system of claim 18, wherein the interface attributes comprise properties that specify a number of overruns.

20. The system of claim 18, wherein the interface attributes comprise properties that specify a frequency with which overruns occur.

21. The system of claim 18, wherein values assigned to the interface attributes are indicated in a graphical model.

22. The system of claim 18, wherein values assigned to the interface attributes are indicated by one of line style, dropback shading and coloring.

23. A computer-readable storage medium holding instructions to execute a model in a real-time system, the instructions when executed causing a computing device to:
provide a model in a modeling environment;
provide a user interface for receiving an instruction for configuring code generation from the model, the user interface including at least one task overrun option for executing code generated from the model in the real-time system;
receive a selection via the user interface that includes one or more of the task overrun options;
generate automatically code for the model based on instructions received via the user interface, the instructions including a selection of the at least one task overrun option, the generated code including a scheduler;
schedule execution of the generated code using the scheduler, the scheduling allowing overruns during the execution; and
execute the generated code in the real-time system.

24. The medium of claim 23, wherein the overruns in the execution of the code occur when the execution of the code is not completed within a given time interval.

25. The medium of claim 24, wherein the instructions when executed further cause the computing device to:
delay, when the overruns occur in the execution of the code, an execution of the code for a new time interval until the execution of the code for the given time interval is completed.

26. The medium of claim 23 wherein the instructions when executed further cause the computing device to:
cancel the execution of the code for a new time interval.

27. The medium of claim 23 wherein the instructions when executed further cause the computing device to:
execute a first portion of the code in the real-time system regularly; and
execute a second portion of the code in the real-time system regularly, the code allowing overruns in the execution of the first and second portions of the code in the real-time system.

28. The medium of claim 27, wherein the instructions when executed further cause the computing device to:
delay, when the overruns occur in an execution of the second portion of the code, the execution of the second portion of the code for a new time interval until the execution of the second portion of the code for a current time interval is completed.

29. The medium of claim 27 wherein the instructions when executed further cause the computing device to:
execute periodically the first portion of the code at a first rate, which is a base rate, and execute periodically the second portion of the code at a second rate, which is a sub-rate.

30. The medium of claim 27, wherein the instructions when executed further cause the computing device to:
preempt the execution of the second portion of the code by the execution of the first portion of the code.

31. The medium of claim 27, wherein the overruns in the execution of the first and second portions of the code change the execution order of the code.

32. The medium of claim 27 wherein the instructions when executed further cause the computing device to:
cancel, when the overruns occur in an execution of the first portion of the code, the execution of the second portion of the code for a new time interval.

* * * * *

UNITED STATES PATENT AND TRADEMARK OFFICE
CERTIFICATE OF CORRECTION

| | | |
|---|---|---|
| PATENT NO. | : 7,613,595 B2 | Page 1 of 1 |
| APPLICATION NO. | : 11/070326 | |
| DATED | : November 3, 2009 | |
| INVENTOR(S) | : David Maclay | |

It is certified that error appears in the above-identified patent and that said Letters Patent is hereby corrected as shown below:

Title Pg, Item (75) Inventors: "David MacLay" should be --David Maclay--.

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,613,595 B2 | Page 1 of 1 |
| APPLICATION NO. | : 11/070326 | |
| DATED | : November 3, 2009 | |
| INVENTOR(S) | : David MacLay | |

It is certified that error appears in the above-identified patent and that said Letters Patent is hereby corrected as shown below:

On the Title Page, Item (73) should read as follows:

"The MathWorks, Inc. Natick, MA"

Signed and Sealed this
Eighteenth Day of November, 2014

Michelle K. Lee
*Deputy Director of the United States Patent and Trademark Office*